(12) United States Patent
Matsushita (10) Patent No.: US 6,664,970 B1
(45) Date of Patent: Dec. 16, 2003

(54) DISPLAY APPARATUS CAPABLE OF ON-SCREEN DISPLAY

(75) Inventor: Akihiro Matsushita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/573,551

(22) Filed: May 19, 2000

(30) Foreign Application Priority Data

May 21, 1999 (JP) ............................................. 11-142131
May 17, 2000 (JP) ........................................ 2000-145122

(51) Int. Cl.[7] .................................................. G09G 5/02
(52) U.S. Cl. ....................... 345/581; 345/600; 345/670; 345/671; 345/669; 348/589
(58) Field of Search ........................... 348/589; 345/581, 345/600, 670, 671, 669

(56) References Cited

U.S. PATENT DOCUMENTS

| | | | | |
|---|---|---|---|---|
| 5,821,947 A | * | 10/1998 | Nguyen ....................... | 345/473 |
| 6,151,425 A | * | 11/2000 | Wakisawa et al. .......... | 345/600 |
| 6,181,318 B1 | * | 1/2001 | Lim ............................. | 345/698 |
| 6,215,467 B1 | * | 4/2001 | Suga et al. .................. | 345/660 |
| 6,236,388 B1 | * | 5/2001 | Iida et al. .................... | 345/100 |
| 6,304,253 B1 | * | 10/2001 | Sung et al. .................. | 358/452 |
| 6,441,913 B1 | * | 8/2002 | Anabuki et al. ........... | 358/1.12 |

* cited by examiner

Primary Examiner—Matthew C. Bella
Assistant Examiner—Mike Rahmjoo
(74) Attorney, Agent, or Firm—Fitzpatrick, Cella, Harper & Scinto (57) ABSTRACT

A display apparatus includes a resolution conversion unit for converting the resolution of an input image signal into a predetermined resolution and generating a sync signal synchronized with the converted image signal, a mixing unit for mixing an on-screen display signal synchronized with the sync signal and the converted image signal, and a display unit for displaying an image related to an image signal output from the mixing means in accordance with the sync signal.

21 Claims, 5 Drawing Sheets

DISPLAY APPARATUS CAPABLE OF ON-SCREEN DISPLAY

BACKGROUND OF THE INVENTION

1. Field of the Invention

The present invention relates to a display apparatus and, more particularly, to an apparatus which converts the resolution of an input image signal and can perform on-screen display.

2. Related Background Art

Recently, computers output image signals having various resolutions. Accordingly, display apparatuses have been manufactured which can receive these image signals having various resolutions output from computers and display images by converting the input resolutions in accordance with the resolution of a display device such as a liquid crystal panel. Also, display apparatuses which can receive not only computer signals but video signals of, e.g., NTSC and display images by converting the input resolutions in accordance with the resolution of a display device, have been manufactured.

Many such display apparatuses have a so-called on-screen display (to be referred to as OSD hereinafter) function which, when the user wants to adjust the contrast, brightness, and position of the screen, displays the states of adjustment as characters on the screen. When this OSD is performed, if OSD information is mixed with an input image signal and the resolution of this mixed image signal is converted in accordance with the resolution of a display device, the size and position of the OSD on the screen change according to the conversion magnification which changes in accordance with the resolution of the input image signal.

To solve the above problem and obtain OSD having the same size regardless of the resolutions of input image signals, the conventional approach is to prepare fonts of OSD characters for different resolutions and switch fonts to be used in accordance with the resolution of interest, thereby obtaining OSD of the same size.

In the above method, however, it is necessary to prepare a plurality of OSD character fonts for different resolutions respectively. This increases the size of an OSD character font memory and the cost. Also, it is necessary to switch fonts to be used for each resolution and reset the OSD position.

SUMMARY OF THE INVENTION

It is an object of the present invention to solve the above problems.

It is another object of the present invention to perform OSD having an optimum size in a predetermined position on a screen even when a resolution conversion process is performed.

To achieve the above objects, according to an aspect of the present invention, there is provided a display apparatus comprising resolution converting means for converting the resolution of an input image signal into a predetermined resolution and generating a sync signal synchronized with the converted image signal, mixing means for mixing an on-screen display signal synchronized with the sync signal and the converted image signal, and display means for displaying an image related to an image signal output from the mixing means in accordance with the sync signal.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will be described with reference to the accompanying drawings.

Figure 1:
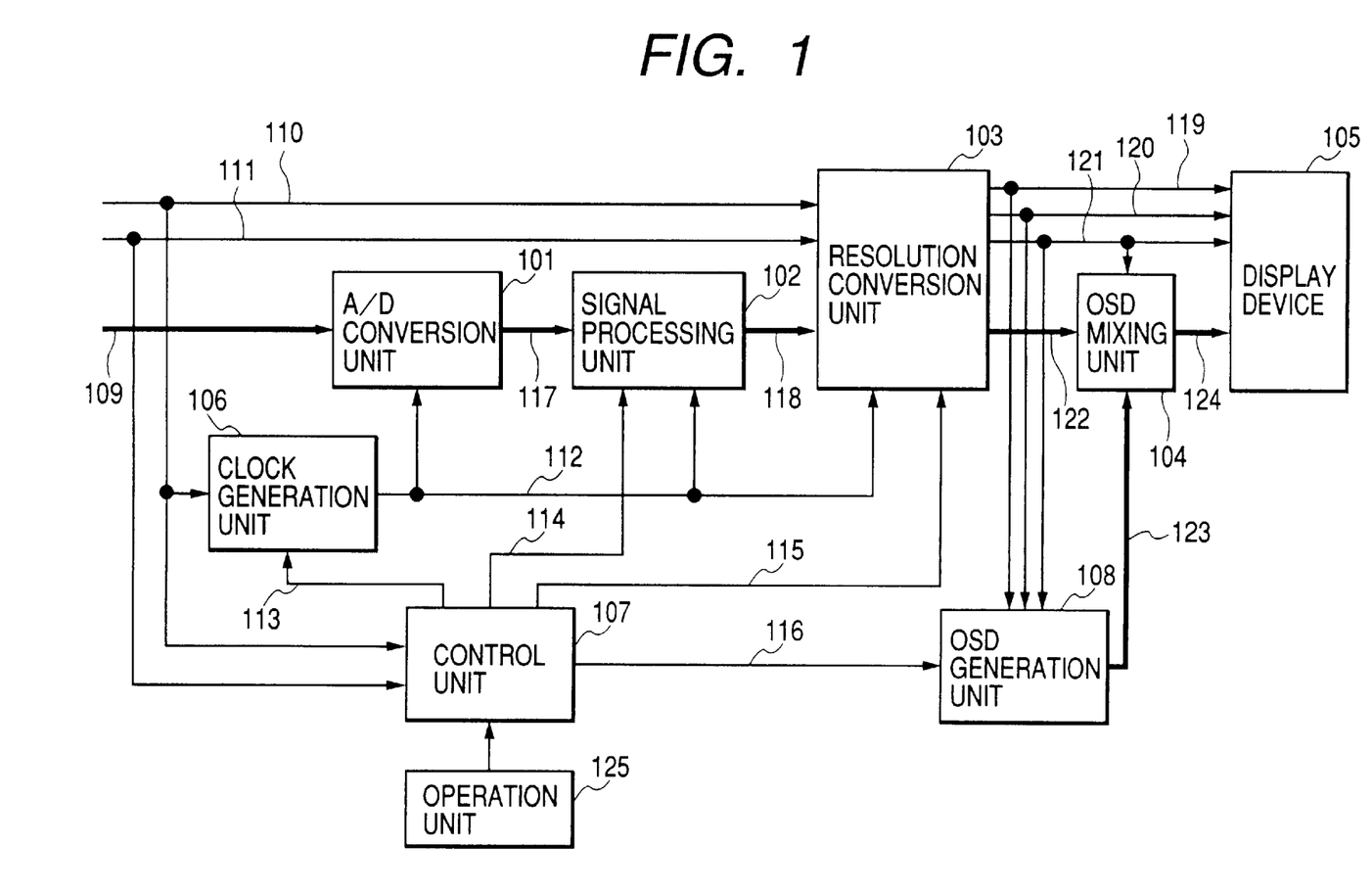
FIG. 1 is a block diagram showing the arrangement of a display apparatus as the first embodiment of the present invention.

FIG. 1 is a block diagram showing a display apparatus according to the first embodiment of the present invention.

Referring to FIG. 1, an analog RGB input image signal 109, such as a computer RGB image signal or a video RGB image signal, is input to an A/D conversion unit 101. Note that a composite video signal or the like is input to the A/D conversion unit 101 after being converted into an analog RGB signal. Simultaneously, a horizontal sync signal 110 and vertical sync signal 111 synchronized with the analog RGB input image signal 109 are input to a resolution conversion unit 103 and control unit 107.

From the input horizontal sync signal 110 and vertical sync signal 111, the control unit 107 measures the horizontal frequency, the polarity of horizontal sync signal, the vertical frequency, and the polarity of vertical sync signal of the input image signal 109. On the basis of the measurement results, the control unit 107 determines the resolution of the input image signal 109.

A clock generation unit 106 receives resolution information such as a frequency division number from the control unit 107 via a control line 113. On the basis of the received information, the clock generation unit 106 divides the frequency of the horizontal sync signal 110 to generate a pixel clock 112 synchronized with the input image signal 109. This pixel clock 112 is input to the A/D conversion unit 101, a signal processing unit 102, and the resolution conversion unit 103 and used in signal processing by each unit.

The A/D conversion unit 101 samples the analog RGB input image signal 109 in pixel basis in accordance with the pixel clock 112, thereby converting the signal into a digital value. An A/D-converted digital image signal 117 is input to the signal processing unit 102. On the basis of set values such as a contrast set value, a brightness set value, and a gamma set value received from the control unit 107 via a control line 114, the signal processing unit 102 performs contrast processing, brightness processing, and gamma processing for the input image signal 117.

An image signal 118 thus processed by the signal processing unit 102 is input to the resolution conversion unit 103. On the basis of resolution information received from the control unit 107 via a control line 115, the resolution conversion unit 103 converts the resolution in accordance with the number of pixels of a display device 105 such as a liquid crystal panel. Assume that the resolution of the input image signal 109 is 640×480 pixels and the resolution of the display device 105 is 1,024×768 pixels.

When this is the case, the control unit 107 sets 640×480 sampling of the image signal 118 and the sampling start position for the resolution conversion unit 103. In accordance with these settings, the resolution conversion unit 103 samples the image signal 118 by 640 (horizontal direction)× 480 (vertical direction) pixels, enlarges it to an image having 1,024×768 pixels which is the resolution of the display device 105, by an operation such as interpolation, and outputs it as an image signal 122.

At the same time, the resolution conversion unit 103 generates a horizontal sync signal 119, a vertical sync signal 120, and a pixel clock 121 for driving the display device 105 and outputs these signals and clock to the display device 105. These horizontal sync signal 119, vertical sync signal 120, and pixel clock 121 are also input to an OSD generation unit 108.

In accordance with the state of operation by an operation unit 125, the control unit 107 sets OSD for the OSD generation unit 108 via a control line 116 at any time. For example, when the user operates the sound volume control by the operation unit 125, the control unit 107 sets volume display on the screen for a few seconds. When the user presses the screen adjusting key, the control unit 107 sets adjustment item display on the screen. During this setting, the horizontal sync signal 119, the vertical sync signal 120, the pixel clock 121, and the image signal 122 are always output at a predetermined timing regardless of the resolution of the input image signal 109. The OSD generation unit 108 outputs an OSD signal 123 synchronized with the input horizontal sync signal 119, vertical sync signal 120, and pixel clock 121.

Figure 2:
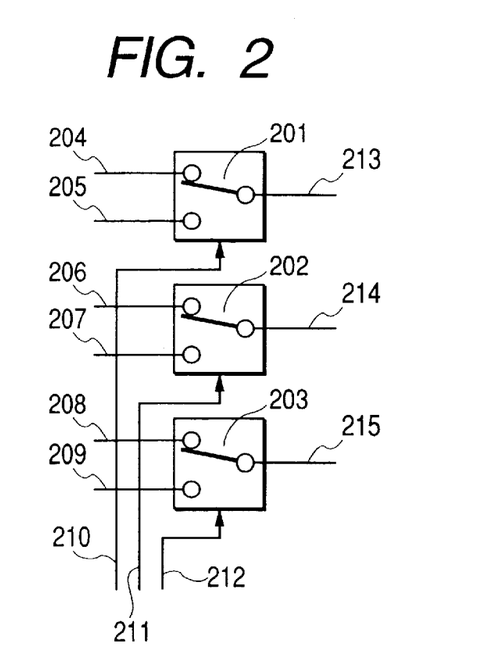
FIG. 2 is a view showing the arrangement of an OSD mixing unit in the apparatus shown in FIG. 1.

The OSD mixing unit 104 mixes the image signal 122 and the OSD signal 123. FIG. 2 shows an example of this OSD mixing unit 104. The operation will be described below with reference to FIG. 2. In this example, assume that the digital image signal takes values of 256 gray levels from gray level 0 to gray level 255.

Referring to FIG. 2, an R image signal 204, G image signal 206, and B image signal 208 as components of the output digital RGB image signal 122 output from the resolution conversion unit 103 are input to one terminal of a switch 201, one terminal of a switch 202, and one terminal of a switch 203, respectively.

Additionally, the OSD generation unit 108 outputs OSD gray scale signals of individual colors, i.e., an ROSD signal 205, a GOSD signal 207, and a BOSD signal 209, in units of pixels to the other terminals of the above switches.

The image signals and OSD signals of individual colors input to these switches are switched in units of pixels by an R selection signal 210, G selection signal 211, and B selection signal 212 input from the OSD generation unit 108, and then output as an R output signal 213, a G output signal 214, and a B output signal 215, respectively.

With the above arrangement and operation, for each pixel of the resolution-converted image signal 122, it is possible to select image signal display or 256-level OSD for each color.

The output timing of the OSD signal 123 from the OSD generation unit 108 and the timings of switching of the switches 201, 202, and 203 by the control signals 210, 211, and 212 are based on the horizontal sync signal 119, the vertical sync signal 120, and the pixel clock 121. Therefore, the OSD signal 123 is always mixed in the same position of the image signal 122 regardless of the resolution of the input image signal 109.

The display device 105 receives a digital RGB signal and a driving signal and displays an image. That is, this display device 105 receives the digital image signal 124 output from the OSD mixing unit 104 and the output horizontal sync signal 119, vertical sync signal 120, and pixel clock 121 output from the resolution conversion unit 103, and displays an image on its screen. On this screen, OSD is always performed in the same position with the same size regardless of the resolution of the input image signal 109.

Figure 3:
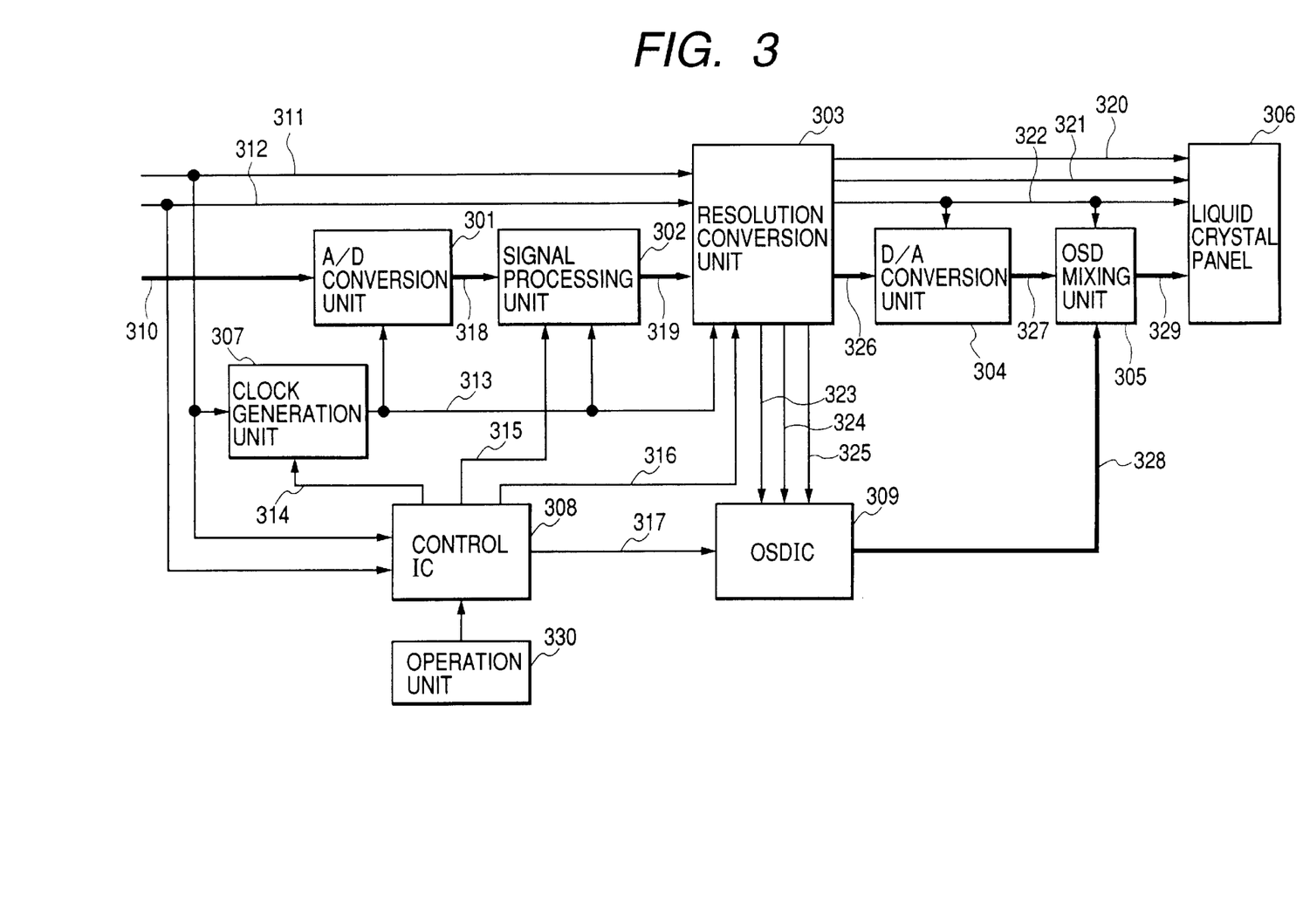
FIG. 3 is a block diagram showing the arrangement of a display apparatus as the second embodiment of the present invention.

FIG. 3 is a block diagram showing a display apparatus according to the second embodiment of the present invention.

Referring to FIG. 3, an analog RGB input image signal 310, such as a computer RGB image signal or a video RGB image signal, is input to an A/D conversion unit 301. Note that a composite video signal or the like is input to the A/D conversion unit 301 after being converted into an analog RGB signal. Simultaneously, a horizontal sync signal 311 and vertical sync signal 312 synchronized with the analog RGB input image signal 310 are input to a resolution conversion unit 303 and a control IC 308.

From the input horizontal sync signal 311 and vertical sync signal 312, the control IC 308 measures the horizontal frequency, the polarity of horizontal sync signal, the vertical frequency, and the polarity of vertical sync signal of the input image signal 310. On the basis of the measurement results, the control IC 308 determines the resolution of the input image signal 310.

A clock generation unit 307 receives resolution information such as a frequency division number from the control IC 308 via a control line 314. On the basis of the received information, the clock generation unit 307 divides the frequency of the horizontal sync signal 311 to generate a pixel clock 313 synchronized with the input image signal 310. This pixel clock 313 is input to the A/D conversion unit 301, a signal processing unit 302, and the resolution conversion unit 303 and used in signal processing by each unit.

The A/D conversion unit 301 samples the analog RGB input image signal 310 in units of pixels in accordance with the pixel clock 310, thereby converting the signal into a digital value. An A/D-converted digital image signal 318 is input to the signal processing unit 302. On the basis of processing information such as a contrast value, brightness value, and gamma value received from the control IC 308 via a control line 315, the signal processing unit 302 performs contrast processing, brightness processing, and gamma processing for the input image signal 318.

An image signal 319 thus processed by the signal processing unit 302 is input to the resolution conversion unit 303. On the basis of resolution information received from the control IC 308 via a control line 316, the resolution conversion unit 303 converts the resolution in accordance with the number of pixels of a liquid crystal panel 306. Assume, for example, that the resolution of the input image signal 310 is 1,600 (horizontal direction)×1,200 (vertical direction) pixels and the resolution of the liquid crystal panel 306 is 1,280×1,024 pixels.

When this is the case, the control IC 308 sets 1,600×1,200 sampling of the image signal 319 and the sampling start position for the resolution conversion unit 303. In accordance with these settings, the resolution conversion unit 303 samples the image signal 319 by 1,600×1,200 pixels, reduces it to an image having 1,280×1,024 pixels which is the resolution of the liquid crystal panel 306 by an operation such as interpolation, and outputs it as an image signal 326.

Also, the resolution conversion unit 303 outputs, to the liquid crystal panel 306, a horizontal driving signal 320, vertical driving signal 321, and pixel driving signal 322 for driving the liquid crystal panel 306. The pixel driving signal 322 is also input to a DA conversion unit 304 and an OSD mixing unit 305 and used in processing by each unit.

Furthermore, the resolution conversion unit 303 generates a horizontal sync signal 323, vertical sync signal 324, and pixel clock 325 synchronized with the converted image signal 326 and outputs these signals and clock to an OSDIC 309. In accordance with the state of operation by an operation unit 330, the control IC 308 sets OSD for the OSDIC 309 via a control line 117 at any time.

For example, when the user operates the sound volume control by the operation unit 330, the control IC 308 sets volume display on the screen for a few seconds. When the user presses the screen adjusting key, the control IC 308 sets adjustment item display on the screen. During this setting, the horizontal driving signal 320, the vertical driving signal 321, the pixel driving signal 322, the image signal 326, the horizontal sync signal 323, the vertical sync signal 324, and the pixel clock 325 are always output at a predetermined timing regardless of the resolution of the input image signal 310.

The OSDIC 309 outputs an OSD signal 328 synchronized with the input horizontal sync signal 323, vertical sync signal 324, and pixel clock 325. The DA conversion unit 304 receives the output image signal 326 from the resolution conversion unit 303, converts the signal into an analog value, and outputs as an analog image signal 327.

Figure 4:
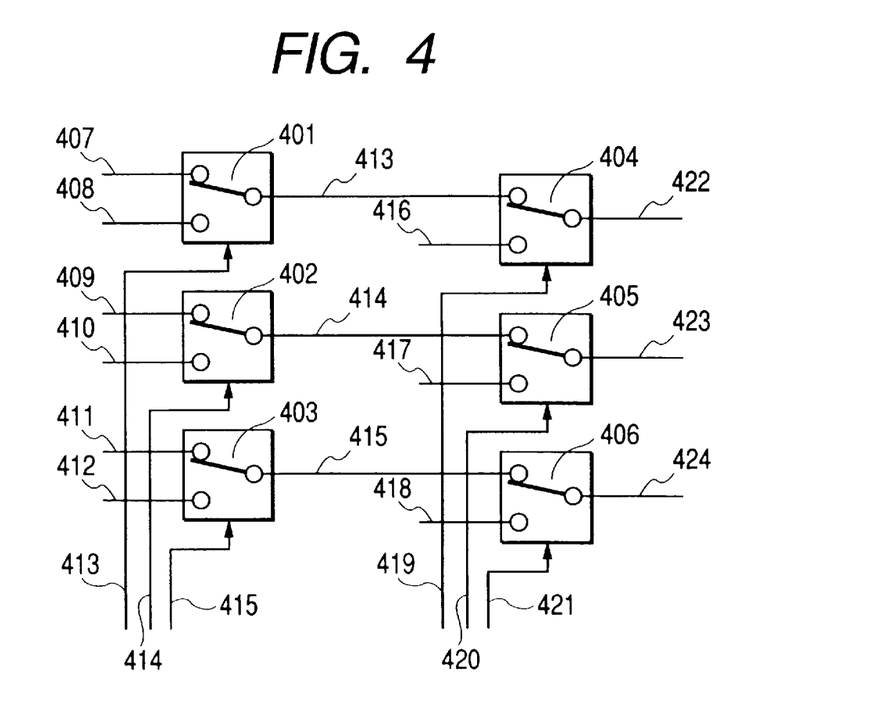
FIG. 4 is a view showing the arrangement of an OSD mixing unit in the apparatus shown in FIG. 3.

The OSD mixing unit 305 mixes the image signal 327 and the OSD signal 328. FIG. 4 shows an example of this OSD mixing unit 305. The operation will be described below with reference to FIG. 4.

Referring to FIG. 4, an R image signal 407, G image signal 409, and B image signal 411 as components of the output analog RGB image signal 327 output from the resolution conversion unit 303 are input to one terminal of a switch 401, one terminal of a switch 402, and one terminal of a switch 403, respectively.

Also, OSD levels 1 of individual colors, e.g., analog voltage values of black signals are input as an ROSD signal 408, a GOSD signal 410, and a BOSD signal 412 to the other terminals of the above switches. These ROSD, GOSD, and BOSD signals 408, 410, and 412 can take predetermined fixed values or can be set by the control IC 308 at any time.

The switches 401, 402, and 403 select an image signal and an OSD signal for each pixel in accordance with an R selection signal 413, G selection signal 414, and B selection signal 415 input from the OSDIC 309. An R image signal 413, G image signal 414, and B image signal 415 as components of the selected image signal are input to one terminal of a switch 404, one terminal of a switch 405, and one terminal of a switch 406, respectively.

Additionally, OSD levels 2 of individual colors, e.g., analog voltage values corresponding to the maximum luminance, are input as an ROSD signal 416, a GOSD signal 417, and a BOSD 418 to the other terminals of the above switches. These ROSD, GOSD, and BOSD signals 416, 417, and 418 can take predetermined fixed values or can be set by the control IC 308 at any time.

The switches 404, 405, and 406 select an image signal and an OSD signal for each pixel in accordance with an R selection signal 419, G selection signal 420, and B selection signal 421 input from the OSDIC 309, and output an R image output 422, a G image output 423, and a B image output 424, respectively.

With the above arrangement and operation, for each pixel of the image signal, it is possible to select image signal display or two-level OSD for each color.

The output timing of the OSD signal 328 from the OSDIC 309, the timings of switching of the switches 401, 402, and 403 by the control signals 413, 414, and 415, and the timings of switching of the switches 404, 405, and 406 by the control signals 418, 419, and 420 are synchronized with the horizontal sync signal 323, vertical sync signal 324, and pixel clock 325 input to the OSDIC 309. Also, the horizontal sync signal 323, the vertical sync signal 324, and the pixel clock 325 are synchronized with the image signal 327. That is, the OSD signal 328 and the image signal 327 are in synchronism with each other. Therefore, the OSD signal 328 is always overwritten in the same position of the image signal 327 regardless of the resolution of the input image signal 310.

The liquid crystal panel 306 receives an analog RGB signal and a driving signal and displays an image. That is, this liquid crystal display 306 receives the analog image signal 329 output from the OSD mixing unit 305 and the output horizontal driving signal 320, vertical driving signal 321, and pixel driving signal 322 output from the resolution conversion unit 303, and displays an image on the screen. On this screen, OSD is always performed in the same position with the same size regardless of the resolution of the input image signal 310.

Figure 5:
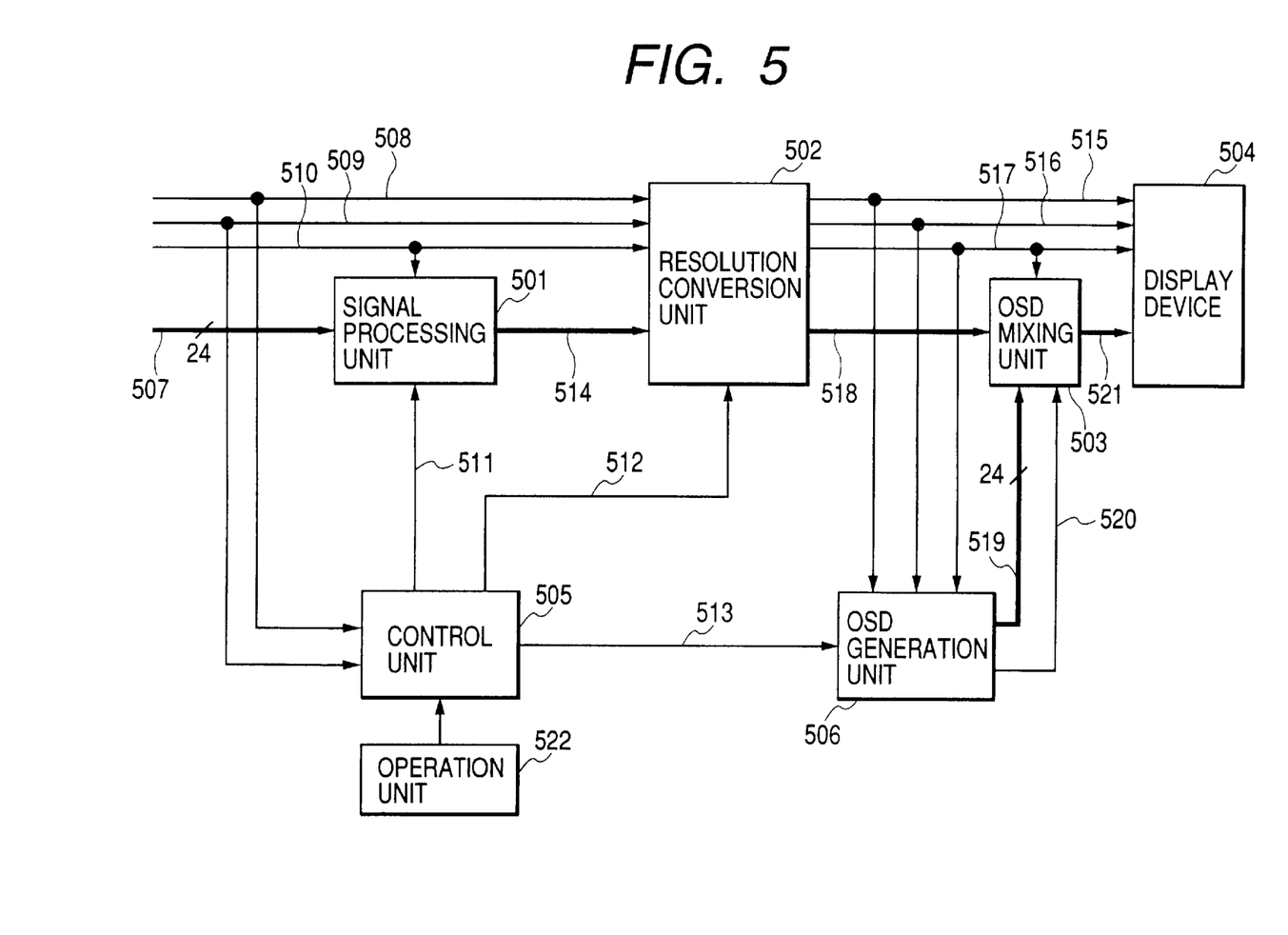
FIG. 5 is a block diagram showing the arrangement of a display apparatus as the third embodiment of the present invention.

FIG. 5 is a block diagram showing a display apparatus according to the third embodiment of the present invention.

Referring to FIG. 5, a digital RGB input image signal 507, such as a computer RGB image signal or a video image signal, is input to a signal processing unit 501. Note that a computer analog signal or a video analog signal is input to the signal processing unit 501 after being converted into a digital RGB signal.

Simultaneously, a horizontal sync signal 508 and vertical sync signal 509 synchronized with the digital RGB input image signal 507 are input to a resolution conversion unit 502 and a control unit 505. Also, a pixel clock 510 of the digital RGB input image signal 507 is input to the signal processing unit 501 and the resolution conversion unit 502.

From the input horizontal sync signal 508 and vertical sync signal 509, the control unit 505 measures the horizontal frequency, the polarity of horizontal sync signal, the vertical frequency, and the polarity of vertical sync signal of the input image signal 507. On the basis of the measurement results, the control unit 505 determines the resolution of the input image signal 507.

The pixel clock 510 is input to the signal processing unit 501 and the resolution conversion unit 502 and used in signal processing by each unit.

On the basis of processing information such as a contrast value, brightness value, and gamma value received from the control unit 505 via a control line 511, the signal processing unit 501 performs contrast processing, brightness processing, and gamma processing for the input image signal 507.

An image signal 514 thus processed by the signal processing unit 501 is input to the resolution conversion unit 502. On the basis of resolution information received from the control unit 505 via a control line 512, the resolution conversion unit 502 converts the resolution of the image signal 514 in accordance with the number of pixels of a display device 504 such as a liquid crystal panel. Assume, for example, that the resolution of the input image signal 507 is 800 (horizontal direction)×600 (vertical direction) pixels and the resolution of the display device 504 is 1,024×768 pixels.

When this is the case, the control unit 505 sets the sampling start position and the magnification for enlarging the image signal 514 for the resolution conversion unit 502. In accordance with these settings, the resolution conversion unit 502 samples the image signal 514 by 800×600 pixels, enlarges it to an image having 1,024×768 pixels which is the resolution of the display device 504 by an operation such as interpolation, and outputs it as an image signal 518.

At the same time, the resolution conversion unit 502 outputs, to the display device 504, a horizontal sync signal 515, vertical sync signal 516, and pixel clock signal 517 for driving the display device 504. Simultaneously, these horizontal sync signal 515, vertical sync signal 516, and pixel clock signal 517 are input to an OSD generation unit 506. The pixel clock signal 517 is also input to an OSD mixing unit 503 at the same time.

In accordance with the state of operation by an operation unit 522, the control unit 505 sets ON/OFF of OSD, the display position of OSD, character strings to be displayed, and OSD signal output timings for the OSD generation unit 506 at any time via a control line 513. For example, when the user switches channels with the operation unit 522, the control unit 505 displays a new channel on the screen and turns off the display a few seconds later. When the user presses the screen adjusting key, the control unit 505 displays adjustment items on the screen.

On the basis of the OSD display information set by the control unit 505, the OSD generation unit 506 outputs, to the OSD mixing unit 503, an OSD signal 519, synchronized with the input horizontal sync signal 515, vertical sync signal 516, and pixel clock signal 517, and a selection signal 520 for determining the method of mixing of OSD.

Figure 6:
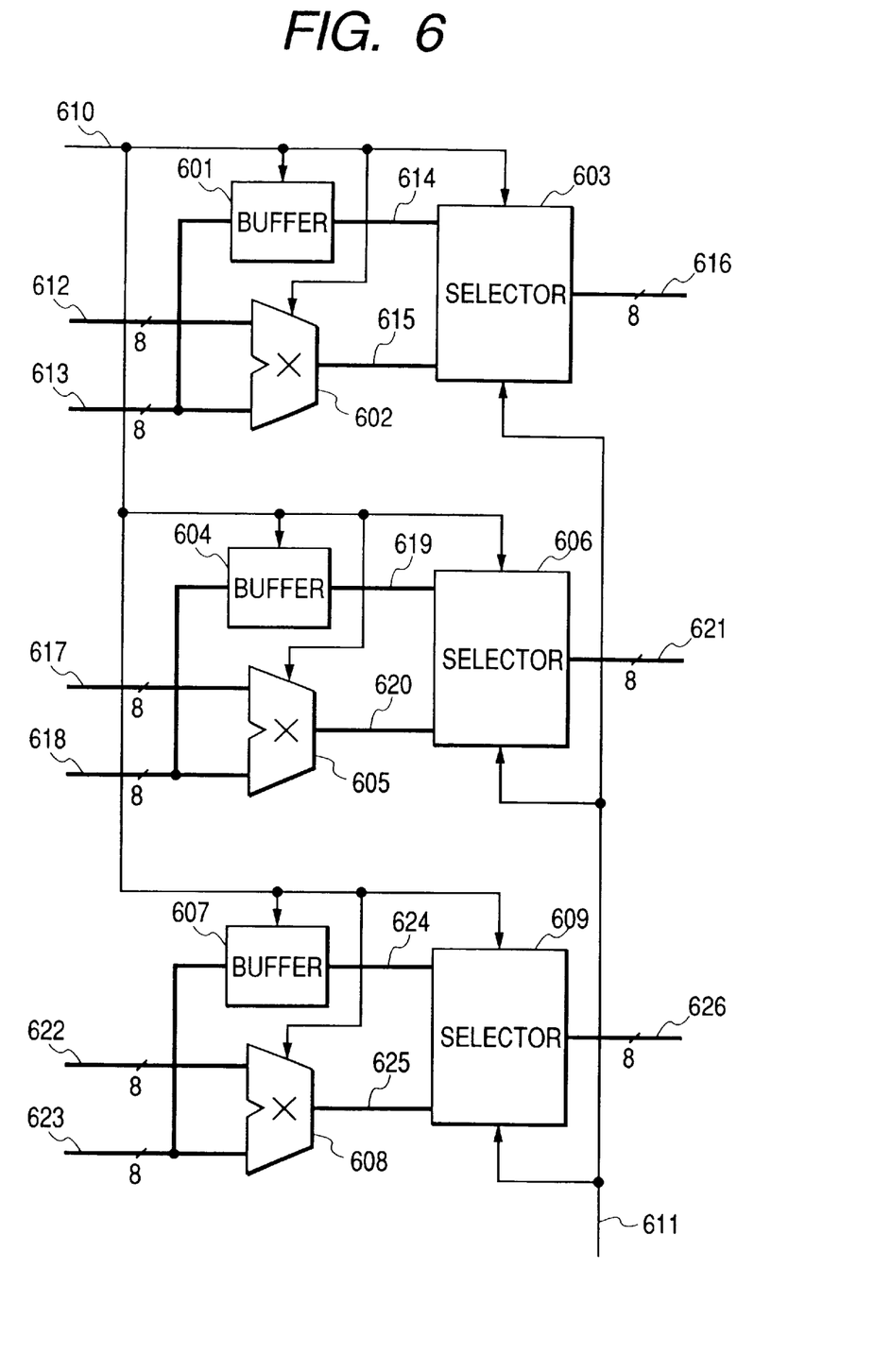
FIG. 6 is a view showing the arrangement of an OSD mixing unit in the apparatus shown in FIG. 5.

The OSD mixing unit 503 mixes the image signal 518 and the OSD signal 519. FIG. 6 shows an example of this OSD mixing unit 503. The operation will be described below with reference to FIG. 6.

Of the output digital RGB image signal 518 output from the resolution conversion unit 502, a red image signal 612 as a red component is input to one terminal of a multiplier 602. Similarly, a green image signal 617 as a green component of the image signal 518 is input to one terminal of a multiplier 605, and a blue image signal 622 as a blue component is input to one terminal of a multiplier 608. Each arithmetic unit such as a multiplier or selector receives a pixel clock signal 610 output from the resolution conversion unit 502 to obtain synchronization with the resolution-converted image.

Each of the red image signal 612, the green image signal 617, and the blue image signal 622 is 8-bit digital data and has 256 gray levels taking values from 0 to 255 respectively.

Of the output OSD signal 519 output from the OSD generation unit 506, an OSD signal 613 as a red component is input to the other terminal of the multiplier 602 and to a buffer 601. It is assumed that this red OSD signal 613 is 8-bit digital data and has 256 gray levels.

The multiplier 602 multiplies the red image signal 612 by the red OSD signal 613 and outputs the product as a signal 615. That is, this signal 615 represents an image formed by changing the contrast of the red image signal 612. The red OSD signal 613 represents the coefficient of the multiplication for the red image signal 612, e.g., represents x0 to x2. Therefore, if this coefficient is x1, the value of the red image signal 612 is directly output. If the product exceeds +255 as the maximum value of 8 bits, correction is performed to set +255 as the product, and this product is output as the signal 615. In this manner, by controlling the value of this red OSD signal 613 at an appropriate timing, OSD multiplexing (mixing) is realized by contrast change.

The buffer 601 is a delay buffer for synchronization with a delay generated in the processing by the multiplier 602.

The output signals 614 and 615 from the buffer 601 and the multiplier 602 are input to a selector 603. In accordance with a selection signal 611 input from the OSD generation unit 506, the selector 603 selects one of these two inputs and outputs the selected signal as a signal 616.

If the selection signal 611 is at low level, the signal 614, i.e., the red OSD signal 613 is selected. This realizes OSD multiplexing (mixing) by switching by the selector 603. If the selection signal 611 is at high level, the signal 615, i.e., the image formed by changing the contrast of the red image signal 612 is selected. To mix OSD by selector switching, therefore, if the red OSD signal 613 as the coefficient of multiplication is set to x1.0 during the period in which the selection signal 611 is at high level, i.e., in which the signal 615 is selected, this is equivalent to performing no contrast changing process for the input red image signal 612. Hence, this red image signal 612 is directly output. On the other hand, to mix (in the mode of mixing) OSD by changing the contrast as described above, the signal 615 is always selected by the selection signal 611.

The green image signal 617 and the blue image signal 622 are processed in entirely the same manner as for the red image signal 612 and output as an output signal 621 and an output signal 626, respectively.

In the above embodiment, an image signal and an OSD signal are mixed by multiplication. However, addition, subtraction, and bit inversion can also be performed as well as multiplication. When addition or subtraction is performed, a superposition signal of an image signal and an OSD signal can be generated. When bit inversion is performed, an image in which black and white portions are inverted can be generated. Furthermore, addition, subtraction, multiplication, and bit inversion can be combined. If this is the case, a variety of display modes are allowed.

In this embodiment, the selector output selection signal 611 is common to three colors R, G, and B. However, different selection signals can also be used for these three colors. Since in this case different mixing methods can be chosen for these three colors, a variety of display modes are allowed.

The OSD signal 519 is synchronized with the horizontal sync signal 515, vertical sync signal 516, and pixel clock signal 517 input to the OSD generation unit 506, so this OSD signal 519 is in synchronism with the image signal 518. Accordingly, the OSD signal 519 is always mixed in the same position of the image signal 518 regardless of the resolution of the input image signal 507.

The display device 504 receives a digital RGB signal and a driving signal and displays an image. That is, this display device 504 receives the output digital image signal 521 output from the OSD mixing unit 503 and the output horizontal sync signal 515, vertical sync signal 516, and pixel clock signal 517 output from the resolution conversion unit 502, and displays an image on the screen.

With the above arrangement and operation, various images such as a normal image, an image containing only OSD, and an image formed by changing the contrast can be selectively displayed on the screen for each pixel. On the screen, OSD is always performed in the same position with the same size regardless of the resolution of the input image signal 507.

A recording medium according to the present invention will be described next.

Each of the embodiments shown in FIGS. 1 and 3 can be constituted by either hardware or a computer system including a CPU and a memory. When each embodiment is constituted by a computer system, the memory forms a storage medium according to the present invention. This storage medium stores programs for executing the operations explained in each embodiment.

This storage medium can be any of a semiconductor memory such as a ROM or RAM, an optical disk, a magnetooptical disk, a magnetic storage medium, and the like. These storage media can be used in the form of, e.g., a CD-ROM, an FD, a magnetic card, a magnetic tape, and a nonvolatile memory card.

Accordingly, by using this storage medium in a system or apparatus other than the systems shown in FIGS. 1 and 3 and allowing the system or its computer to read out and execute program codes stored in the storage medium, it is possible to realize functions equivalent to those of the above embodiments, to obtain equivalent effects, and to achieve the objects of the present invention.

Furthermore, it is possible to realize functions equivalent to those of the above embodiments, to obtain equivalent effects, and to achieve the objects of the present invention, when an OS or the like operating on a computer executes a part or the whole of processing, or when program codes read out from a storage medium are written in a memory of a function extension board inserted into a computer or of a function extension unit connected to a computer and, on the basis of instructions from the program codes, a CPU or the like of the function extension board or the function extension unit executes a part or the whole of processing.

Many widely different embodiments of the present invention may be constructed without departing from the spirit and scope of the present invention. It should be understood that the present invention is not limited to the specific embodiments described in the specification, except as defined in the appended claims.

What is claimed is:

1. A display apparatus comprising:
   resolution converting means for converting the resolution of an input image signal into a predetermined resolution and generating a sync signal synchronized with the converted image signal;
   mixing means for mixing an on-screen display signal synchronized with the sync signal and the converted image signal, wherein said mixing means comprises generating means for generating a coefficient signal associated with the on-screen display signal, and multiplying means for multiplying the converted image signal by the coefficient signal; and
   display means for displaying an image related to an image signal output from said mixing means in accordance with the sync signal.

2. An apparatus according to claim 1, wherein said resolution converting means converts the resolution of the input image signal in accordance with the display resolution of said display means.

3. An apparatus according to claim 1, wherein said resolution converting means generates a horizontal sync signal, a vertical sync signal, and a pixel clock.

4. An apparatus according to claim 1, wherein said mixing means comprises generating means for generating an on-screen display level signal for determining the luminance of the on-screen display signal, and selecting means for selectively outputting the converted image signal and the on-screen display level system.

5. An apparatus according to claim 1, wherein said resolution converting means comprises resolution determining means for determining the resolution of the input image signal, and performs a resolution conversion process for the input image signal in accordance with the determination result.

6. An apparatus according to claim 1, wherein said mixing means further comprises selecting means for selectively outputting the coefficient signal and an image signal output from said multiplying means.

7. An apparatus according to claim 1, wherein said display means comprises a liquid crystal panel.

8. A display method comprising:
   a resolution conversion step of converting the resolution of an input image signal into a predetermined resolution and generating a sync signal synchronized with the converted image signal;
   a mixing step of mixing an on-screen display signal synchronized with the sync signal and the converted image signal, wherein said mixing step comprises a step of generating a coefficient signal associated with the on-screen display signal, and a step of multiplying the converted image signal by the coefficient signal; and
   a display step of displaying an image related to an image signal output in said mixing step in accordance with the sync signal.

9. A method according to claim 8, wherein said resolution conversion step comprises a step of converting the resolution of the input image signal in accordance with the display resolution of said display step.

10. A method according to claim 8, wherein said resolution conversion step comprises a step of generating a horizontal sync signal, a vertical sync signal, and a pixel clock.

11. A method according to claim 8, wherein said mixing step comprises a step of generating an on-screen display level signal for determining the luminance of the on-screen display signal, and a step of selectively outputting the converted image signal and the on-screen display level signal.

12. A method according to claim 8, wherein said resolution conversion step comprises a step of determining the resolution of the input image signal, and comprises a step of performing a resolution conversion process for the input image signal in accordance with the determination result.

13. A method according to claim 8, wherein said mixing step further comprises a step of selectively outputting the coefficient signal ands an image signal from said multiplication step.

14. A method according to claim 8, wherein said display step comprises using a liquid crystal panel.

15. A display apparatus comprising:
   resolution converting means for converting the resolution of an input image signal into a predetermined resolution and generating a sync signal synchronized with the converted image signal;
   mixing means for mixing an on-screen display signal synchronized with the sync signal and the converted image signal, wherein said mixing means comprises generating means for generating a first signal having a first predetermined level associated with the on-screen display signal and a second signal having a second predetermined level associated with the on-screen display signal, and selecting means for selectively outputting the converted image signal and the first and second signals; and display means for displaying an image related to an image signal output from said mixing means in accordance with the sync signal.

16. A display method comprising:

a resolution converting step of converting the resolution of an input image signal into a predetermined resolution and generating a sync signal synchronized with the converted image signal;

a mixing step of mixing an on-screen display signal synchronized with the sync signal and the converted image signal, wherein said mixing step comprises a step of generating a first signal having a first predetermined level associated with the on-screen display signal and a second signal having a second predetermined level associated with the on-screen display signal, and a step of selectively outputting the converted image signal and the first and second signals; and a display step of displaying an image related to an image signal output in said mixing step in accordance with the sync signal.

17. A display control apparatus comprising:

input means for inputting an image signal;

resolution converting means for converting the resolution of the image signal input by said input means into a predetermined resolution and for outputting a resolution converted image signal;

mixing means for generating a coefficient signal associated with an on-screen display signal to be mixed with the resolution converted image signal and for mixing an on-screen display signal and the resolution converted image signal outputted from said resolution converting means by multiplying the resolution converted image signal by the coefficient signal; and output means for outputting a mixed image signal output from said mixing means to a display device so that an image related to the mixed image signal is displayed by said display device.

18. An apparatus according to claim 17, wherein said resolution converting means converts the resolution of the input image signal in accordance with the display resolution of said display device.

19. An apparatus according to claim 17, wherein said resolution converting means comprises resolution determining means for determining the resolution of the input image signal, and performs a resolution conversion process for the input image signal in accordance with the determining result.

20. An apparatus according to claim 17, wherein said input means inputs the image signal from a computer device.

21. An apparatus according to claim 17, further comprising on-screen display signal generating means for generating the on-screen display signal and for outputting the on-screen display signal, said mixing means mixing the on-screen display signal outputted from said on-screen display signal generating means and the resolution converted image signal.

* * * * *

UNITED STATES PATENT AND TRADEMARK OFFICE
CERTIFICATE OF CORRECTION

PATENT NO. : 6,664,970 B1
DATED : December 16, 2003
INVENTOR(S) : Matsushita

It is certified that error appears in the above-identified patent and that said Letters Patent is hereby corrected as shown below:

Column 10,
Line 8, "system." should read -- signal. --.

Signed and Sealed this

Thirty-first Day of August, 2004

JON W. DUDAS
*Director of the United States Patent and Trademark Office*